(12) United States Patent
Kondo et al.

(10) Patent No.: US 11,202,996 B2
(45) Date of Patent: *Dec. 21, 2021

(54) FILTRATION FILTER

(71) Applicant: Murata Manufacturing Co., Ltd., Nagaokakyo (JP)

(72) Inventors: Takashi Kondo, Nagaokakyo (JP); Masaru Banju, Nagaokakyo (JP); Seiichi Matsumoto, Nagaokakyo (JP); Seiji Kamba, Nagaokakyo (JP); Wataru Yamamoto, Nagaokakyo (JP); Yoshiji Okamoto, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/511,112

(22) Filed: Jul. 15, 2019

(65) Prior Publication Data

US 2019/0336919 A1 Nov. 7, 2019

Related U.S. Application Data

(63) Continuation of application No. 15/475,804, filed on Mar. 31, 2017, now Pat. No. 10,399,042, which is a
(Continued)

(30) Foreign Application Priority Data

Jul. 31, 2015 (JP) .............................. JP2015-152038
Dec. 3, 2015 (JP) .............................. JP2015-236264

(51) Int. Cl.
*B01D 71/02* (2006.01)
*B01D 46/10* (2006.01)
(Continued)

(52) U.S. Cl.
CPC ........... *B01D 71/022* (2013.01); *B01D 39/12* (2013.01); *B01D 46/10* (2013.01); *B01D 63/08* (2013.01);
(Continued)

(58) Field of Classification Search
CPC ...... B01D 71/022; B01D 39/12; B01D 65/00; B01D 46/10; B01D 63/08; B01D 2313/025; B01D 2313/04
(Continued)

(56) References Cited

U.S. PATENT DOCUMENTS 3,932,153 A 1/1976 Byrns
4,479,874 A * 10/1984 Rosenberg ........... B01D 29/012
210/445

(Continued)

FOREIGN PATENT DOCUMENTS

JP S57-5827 U 1/1982
JP S62-123738 U 8/1987
(Continued)

OTHER PUBLICATIONS

International Search Report issued in International Application No. PCT/JP2016/070457, dated Aug. 30, 2016.
(Continued)

*Primary Examiner* — Nam X Nguyen
*Assistant Examiner* — Julia L. Wun
(74) *Attorney, Agent, or Firm* — Arent Fox LLP

(57) ABSTRACT

A filtration filter comprises a metallic mesh having a circumferential shape and radially inner and outer portions. The metallic mesh is adapted to filter out a filtration target object contained in a fluid passing through the membrane. First and second frame members hold the outer portion there between so as to create first and second bent sections separated by a transition section extending between the first
(Continued)

and second bent sections. The transition section includes at least one streaked projection.

16 Claims, 8 Drawing Sheets

Related U.S. Application Data continuation of application No. PCT/JP2016/070457, filed on Jul. 11, 2016.

(51) Int. Cl.
  *B01D 63/08* (2006.01)
  *B01D 39/12* (2006.01)
  *B01D 65/00* (2006.01)

(52) U.S. Cl.
  CPC ........ *B01D 65/00* (2013.01); *B01D 2313/025* (2013.01); *B01D 2313/04* (2013.01)

(58) Field of Classification Search
  USPC ............ 210/445, 321.6, 321.75, 321.84, 435
  See application file for complete search history.

(56) References Cited

U.S. PATENT DOCUMENTS

| | | | |
|---|---|---|---|
| 5,100,548 A | 3/1992 | Oelbermann | |
| 5,443,723 A * | 8/1995 | Stankowski | ......... B01D 63/087 |
| | | | 210/321.75 |
| 6,033,455 A | 3/2000 | Kurashima | |
| 6,131,573 A * | 10/2000 | Brown | ................... A61B 5/097 |
| | | | 128/202.28 |
| 8,333,817 B2 | 12/2012 | Felber et al. | |
| 8,962,049 B2 * | 2/2015 | Doleac | ................. A47J 31/407 |
| | | | 426/77 |
| 2014/0346106 A1 | 11/2014 | Anzai et al. | |
| 2016/0195458 A1 | 7/2016 | Kikuhara et al. | |

FOREIGN PATENT DOCUMENTS

| | | |
|---|---|---|
| JP | H02-25006 U | 2/1990 |
| JP | H07-136411 A | 5/1995 |
| JP | H09-108521 A | 4/1997 |
| JP | 2008-202799 A | 9/2008 |
| JP | 2008-246430 A | 10/2008 |
| JP | 2009-106881 A1 | 5/2009 |
| WO | WO 2013/111394 A1 | 8/2013 |
| WO | WO 2015/019889 A1 | 2/2015 |

OTHER PUBLICATIONS

Written Opinion of the International Searching Authority issued in International Application No. PCT/JP2016/070457, dated Aug. 30, 2016.

\* cited by examiner

FILTRATION FILTER

CROSS REFERENCE TO RELATED APPLICATIONS

The present application is a continuation of U.S. patent application Ser. No. 15/475,804 filed Mar. 31, 2107 which is a continuation of International application No. PCT/JP2016/070457, filed on Jul. 11, 2016, which claims priority to Japanese Patent Applications Nos. 2015-236264, filed on Dec. 3, 2015 and 2015-152038, filed on Jul. 31, 2015, the entire contents of each of which are incorporated herein by reference.

TECHNICAL FIELD

The present invention relates to filtration filters that filter out filtration target objects contained in fluids and filtration filter devices.

BACKGROUND ART

In general, this type of filtration filter is so constituted as to pinch, with a first frame member and a second frame member, a circumference portion of a metallic mesh that filters out a filtration target object contained in a fluid (for example, see International Publication No. 2015/019889).

However, the existing filtration filter additionally needs a plurality of fixing components to hold the first frame member and the second frame member in a state of pinching the metallic mesh therebetween, thereby raising a problem that the number of components becomes large.

An object of the present invention is to provide a filtration filter capable of increasing a holding force of a first frame member and a second frame member with respect to a metallic mesh and decreasing the number of components, and a filtration filter device including the stated filtration filter, thereby solving the above-mentioned problem.

BRIEF DESCRIPTION OF THE INVENTION

In order to accomplish the above object, a filtration filter according to an aspect of the present invention includes:

a metallic mesh that filters out a filtration target object contained in a fluid; and a first frame member and a second frame member configured to pinch a circumference portion of the metallic mesh therebetween, wherein the circumference portion of the metallic mesh includes a first bending section and a second bending section and also includes a streaked projection between the first bending section and the second bending section.

BRIEF DESCRIPTION OF THE INVENTION

In accordance with one aspect of the invention, a filtration filter comprises a metallic mesh having a circumferential shape and radially inner and outer portions. The metallic mesh is adapted to filter out a filtration target object contained in a fluid passing through the membrane. First and second frame members hold the outer portion there between so as to create first and second bent sections separated by a transition section extending between the first and second bent sections. The transition section include at least one streaked projection.

With the filtration filter according to the present invention, it is possible to increase the holding force of the first frame member and the second frame member with respect to the metallic mesh and decrease the number of components.

The transition section preferably includes a plurality of streaked projections. Preferably at least one of the streaked projections extends in a direction intersecting a radial direction extending from a center of metallic mesh. The transition section preferably has a radially inward half and a radially outward half and more of the streaked projections are located on the radially inward half than the radially outward half. The plurality of streaked projections are preferably arranged in irregular directions. These features improve the holding force of the first and second frame members.

The transition section is preferably conical in shape and the streaked projections are preferably creases formed in the metallic mesh.

The first and second frame members preferably have opposing walls which sandwich the outer portion of the metallic mesh. The opposing walls have a first section which defines a first gap which houses the transition section and a second section, located radially outward from the second bending section, which defines a second gap which houses a portion of the outer portion of the metallic mesh located radially outward of the second bending section. The first gap is preferably smaller than the second gap.

With this structure, it is possible to prevent the circumference portion of the first frame member and the circumference portion of the second frame member from contacting each other before the first gap housing the transition section becomes an appropriate dimension. This makes it possible to allow the first gap to have an appropriate dimension, increase the friction force by the streaked projections, and enhance the holding force of the first and second frame members with respect to the metallic mesh. Further, it can be assumed that the first gap has an appropriate dimension by confirming that the second gap falls within a predetermined range.

The metallic mesh is preferably, but not necessarily, circular in shape.

The inner portion of the metallic mesh preferably lies in a plane and the transition section moves downwardly from the plane. More preferably, the transition section extends from the plane at an obtuse angle.

In the preferred embodiment, the metallic mesh has a thickness and the streaked project extends 0.1 to 2.0 times that thickness.

The invention is further directed towards a filtration filter device including a metallic mesh and a housing encompassing the membrane. The membrane has first and second opposed principle surfaces and a circumferential shape and radially inner and outer portions. The housing encompasses the metallic mesh and defines a fluid incoming path which opposes the first principal surface of the metallic mesh and a fluid discharging path which opposes the second principal surface.

The housing includes a first housing section which defines the fluid incoming path and a second housing which defines the fluid discharge path. The first housing section includes a first frame member and the second housing section includes a second frame member. The first and second housings are fitted to each other in such a manner that the first and second frame members hold the outer portion of the metallic mesh there between so as to create first and second bent sections separated by a transition section extending between the first and second bent sections. The transition section includes at least one streaked projection.

The transition section preferably includes a plurality of streaked projections. Preferably at least one of the streaked projections extends in a direction intersecting a radial direction extending from a center of metallic mesh.

In one aspect of the invention, the transition section has a radially inward half and a radially outward half and more of the streaked projections are located on the radially inward half than the radially outward half. The plurality of streaked projections are preferably arranged in irregular directions.

The transition section is preferably conical in shape and the streaked projections are preferably creases formed in the metallic mesh.

The first and second frame members preferably have opposing walls which sandwich the outer portion of the metallic mesh. The opposing walls having a first section which define a first gap which houses the transition section and a second section, located radially outward from the second bending section, which define a second gap which houses a portion of the outer portion of the metallic mesh located radially outward of the second bending section. The first gap is preferably smaller than the second gap.

With this structure, it is possible to prevent the circumference portion of the first housing section and the circumference portion of the second housing section from contacting each other before the first gap housing the transition section becomes an appropriate dimension. This makes it possible to allow the first gap to have an appropriate dimension, increase the friction force by the streaked projections, and enhance the holding force of the first and second frame members with respect to the metallic mesh. Further, it can be assumed that the first gap has an appropriate dimension by confirming that the second gap falls within a predetermined range.

With the foregoing structures, the filtration filter device can be constituted of three components

DESCRIPTION OF A PREFERRED EMBODIMENT

Figure 1:
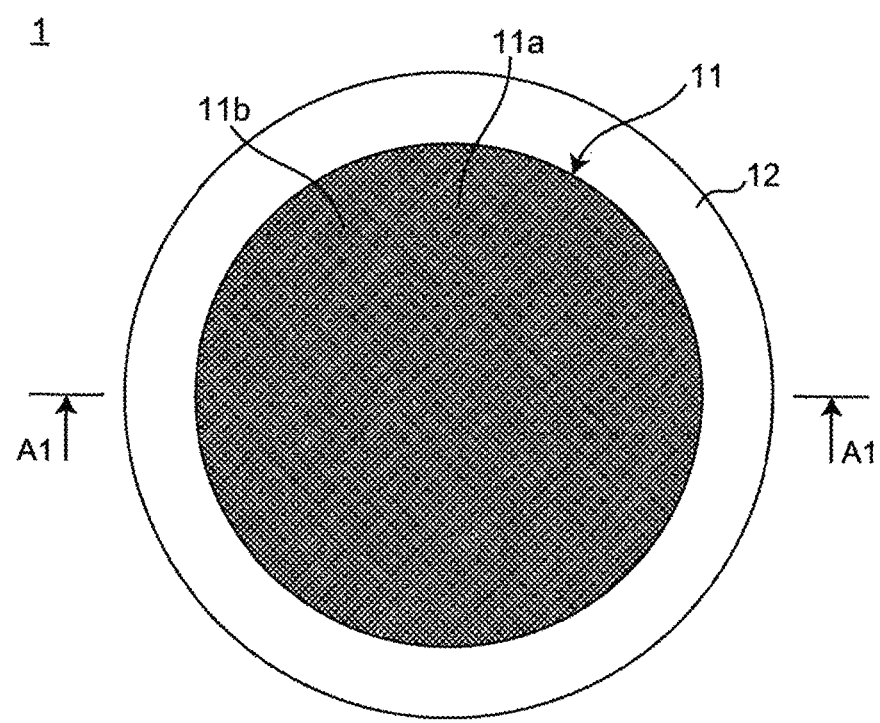
FIG. 1 is a plan view illustrating a general structure of a filtration filter according to an embodiment of the present invention.
Figure 2:
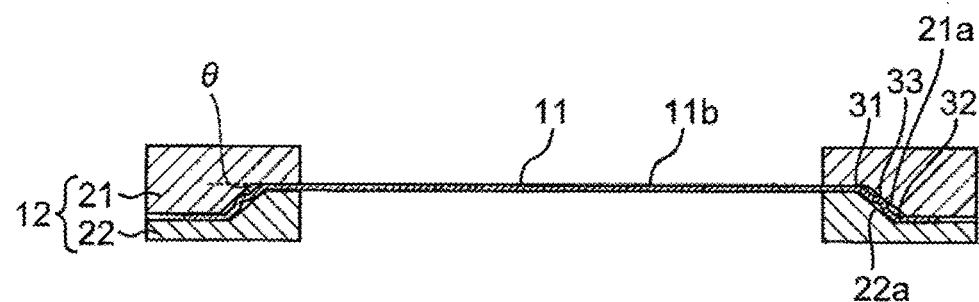
FIG. 2 is a cross-sectional view taken along an A1-A1 line in FIG. 1.

FIG. 1 is a plan view illustrating a general structure of a filtration filter according to an embodiment of the present invention. FIG. 2 is a cross-sectional view taken along an A1-A1 line in FIG. 1.

In the present embodiment, the filtration target objects are biological materials contained in liquids. As used herein "biological materials" refer to cells (eukaryotes), bacteria (eubacteria), and materials derived from organisms such as viruses. The cells (eukaryotes) include, for example, ova, sperms, induced pluripotent stem cells (iPS cells), ES cells, stem cells, mesenchymal stem cells, monocyte cells, single cells, cell aggregation, planktonic cells, adherent cells, nerve cells, leukocytes, lymphocytes, regenerative medicine cells, autologous cells, cancer cells, circulating tumor cells (CTCs), HL-60, HELA, and fungi. The bacteria (eubacteria) include, for example, gram-positive bacteria, gram-negative bacteria, coli bacilli, and tubercle bacilli. The viruses include, for example, DNA viruses, RNA viruses, rotaviruses, (avian) influenza viruses, yellow fever viruses, dengue fever viruses, encephalitis viruses, hemorrhagic fever viruses, and immunodeficiency viruses.

As shown in FIGS. 1 and 2, a filtration filter 1 according to the present embodiment includes a metallic mesh 11 and a frame body 12 for holding the circumference portion of the metallic mesh 11. The metallic mesh 11 includes a pair of opposed principal surfaces 11b and a plurality of through-holes 11a passing through both principal surfaces. The though-holes 11a are configured to isolate the biological materials from a liquid. The shape and dimensions of each through-hole 11a are appropriately set in accordance with the shapes and dimensions of the biological materials to be captured by the membrane 11. The though-holes 11a are, for example, arranged at a constant interval or arranged periodically. Each through-hole 11a is preferably, but not necessarily, formed in a square shape when viewed from a principal surface side of the metallic mesh 11. The size of the through-holes 11a are, for example, no less than 0.1 μm and no more than 500 μm long, and no less than 0.1 μm and no more than 500 μm wide. It is preferable that the interval between the through-holes 11a be no more than 10 times the size of the opening of the through-hole 11a, and more preferable to be no more than three times the size of the opening of the through-hole 11a. An opening rate of the through-holes 11a in the metallic mesh 11 is, for example, equal to or more than 10%.

The metallic mesh 11 may be made, for example, of gold, silver, copper, platinum, nickel, stainless steel, palladium, titanium, cobalt, or an alloy of these metals. The diameter of the metallic mesh 11 is, for example, 6 mm. The thickness of the metallic mesh 11 is, for example, no less than 0.1 μm and no more than 100 μm, and is preferably no less than 0.1 μm and no more than 50 μm. An outer shape of the metallic mesh 11 can take many forms, for example a circle, an ellipse and a polygonal. In the present embodiment, the outer shape of the metallic mesh 11 takes circular form. The through-holes 11a may, or may not, be formed in the circumference portion of the metallic mesh 11 as desired.

The frame body 12 includes a first frame member 21 and a second frame member 22. The frame members 21 and 22 are each formed in a ring-like shape (for example, a circular shape). The circumference portion of the first frame member 21 extends downwardly and the circumference portion of the second frame member 22 is correspondingly recessed downwardly to accommodate the downwardly extending portion of the first frame member 21. The first frame member 21 includes a slope 21a that is slanted downward as it moves away from the center portion of the frame member. The second frame member 22 includes a corresponding slope 22a that is slanted downward as it moves away from the center portion of the frame member.

The first and second frame members 21 and 22 can be made, for example, of a metal such as duralumin and aluminum, a resin such as polyethylene, polystyrene, polypropylene, polycarbonate, polyacetal, and polyetherimide, or the like can be cited. The width of the frame body 12 is, for example, 0.9 mm. The thickness of the frame body 12 is, for example, 3 mm.

The first frame member 21 and the second frame member 22 pinch (clasp) the circumference portion of the metallic mesh 11 therebetween so that the circumference portion of the metallic mesh 11 includes a first bending section 31 and a second bending section 32 with a conical transition portion located therebetween. The first and second bending sections 31 and 32 are each formed in a ring-like shape (for example, a circular shape). The first bending section 31 has a shorter diameter than the second bending section 32 and is arranged closer to the center of the metallic mesh 11 than the second bending section 32. Each of the first and second bending sections 31 and 32 may be bent, for example, in an arc-like shape or at an obtuse angle.

The first and second bending sections 31 and 32 are connected by a conical transition portion located between the sloped sections 21a, 22a of the first and second frame members 21, 22 so that the distance that the transition portion is spaced from the principal plane of the metallic mesh 11 increases as it moves away from the center of the metallic mesh 11. A plurality of streaked projections 33 (see FIGS. 2 and 3) are formed in the transition portion. Each streaked projection 33 projects from the conical plane of the transition portion by a length which is preferably 0.1 to 2 times the thickness of the metallic mesh 11.

Figure 3:
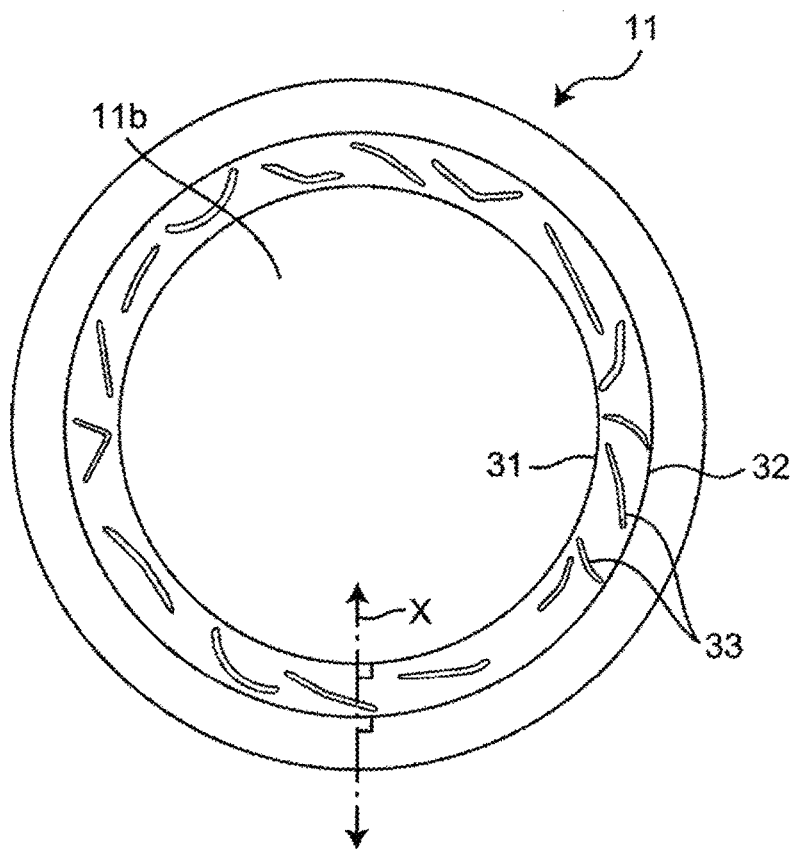
FIG. 3 is a plan view illustrating a metallic mesh of the filtration filter shown in FIG. 1.

FIG. 3 is a plan view illustrating the metallic mesh 11 in which the plurality of streaked projections 33 are formed on the transition portion of the membrane (which is located between the first and second bending sections 31 and 32). As shown in FIG. 3, the plurality of streaked projections 33 are preferably arranged in irregular directions. However, at least one of the plurality of streaked projections 33 is formed to extend in a direction intersecting with a radial direction X extending from the center portion of the metallic mesh 11 toward the circumference of the metallic mesh 11 (i.e., extends in a direction other than the radial direction).

With the filtration filter according to the present embodiment, a friction force between the first and second frame members 21, 22 and the transition portion of the metallic mesh 11 is increased by the streaked projections 33. This makes it possible to increase a holding force of the first and second frame members 21 and 22 with respect to the metallic mesh 11. As such, the need for providing a plurality of fixing components to hold the first and second frame members 21 and 22 in a state of pinching the metallic mesh 11 therebetween can be reduced, thereby making it possible to reduce the number of components.

Moreover, because the plurality of streaked projections 33 are provided, the effective thickness of the metallic mesh 11 in the transition portion is increased, which makes it easy for the force to be applied. As a result, the friction force between the first and second frame members 21, 22 on the one hand and the transition portion of the metallic mesh 11 on the other can be increased, thereby making it possible to further increase the holding force of the first and second holding members 21 and 22 with respect to the metallic mesh 11.

With the filtration filter according to the present embodiment, at least one of the plurality of streaked projections 33 is formed to extend in a direction intersecting with the radiation direction X extending from the center portion of the metallic mesh 11 toward the circumference portion of the metallic mesh 11. As such, by arranging the streaked projections 33 in this manner, the friction force between the first and second frame members 21, 22 and the transition portion of the metallic mesh 11 can be increased. This, in turn, makes it possible to increase the holding force of the first and second frame members 21 and 22 with respect to the metallic mesh 11.

Further, in the filtration filter according to the present embodiment, the plurality of streaked projections 33 are arranged in irregular (non-uniform) directions, which makes it possible to increase the holding force of the first and second frame members 21 and 22 with respect to the metallic mesh 11 in comparison with a case in which the plurality of streaked projections 33 are arranged in regular directions (for example, if all the streaked projections 33 were arranged in directions parallel to each other).

In the filtration filter according to the present embodiment, the transition portion is slanted at an obtuse angle relative to the principal plane of the principal surface 11a (i.e., the horizontal direction of FIG. 2) of the metallic mesh 11. As a result, the stress on the metallic mesh is reduced. With this structure, as best shown in FIG. 2, an angle θ at which the metallic mesh 11 is bent is less than 90 degrees (thereby reducing) a load is exerted on the metallic mesh 11. In addition, the required precision in position adjustment between the first frame member 21 and the second frame member 22 can be lowered in comparison with a case in which the area between the first bending section 31 and the second bending section 32 is arranged to be perpendicular to the principal surface 11b of the metallic mesh 11.

It is preferable that the surface area of the transition portion on the second bending section 32 side be larger than a surface area of the transition portion on the first bending section 31 side. This inherently occurs because the transition portion is conical in shape. This makes it possible to increase a friction force between the first and second frame members 21, 22 and a portion on the second bending section side having a longer circumferential length than the first bending section 31 can be increased, and further increase the holding force of the first and second frame members 21 and 22 with respect to the metallic mesh 11.

The streaked projections 33 are preferably formed by forming fine folds in the transition portion of the metallic mesh 11 itself. Because the streaked projections can be formed in the metallic mesh 11 itself, it becomes unnecessary to additionally provide a member for constituting the streaked projections 33.

Although, in the present embodiment, the filtration target objects are considered to be biological materials contained in liquids, the invention is not limited thereto. The filtration target objects may be, for example, materials contained in gases. In other words, the filtration target objects may be materials contained in fluids, and may be PM 2.5 contained in the air, for example.

Further, although, in the present embodiment, the filtration filter 1 is considered to be used to filter out the biological materials from a liquid, the present invention is not limited thereto. For example, the filtration filter 1 may be used to thicken a liquid.

Furthermore, although, in the present embodiment, the plurality of streaked projections 33 are formed in the transition portion between the first bending section 31 and the second bending section 32, the invention is not limited thereto. For example, a single streaked projection 33 may be formed in the transition portion between the first bending section 31 and the second bending section 32. The single streaked projection 33 may, for example, be formed in a zigzag pattern or in a ring-like shape so as to surround the first bending section 31.

(Working Example 1)

Figure 4:
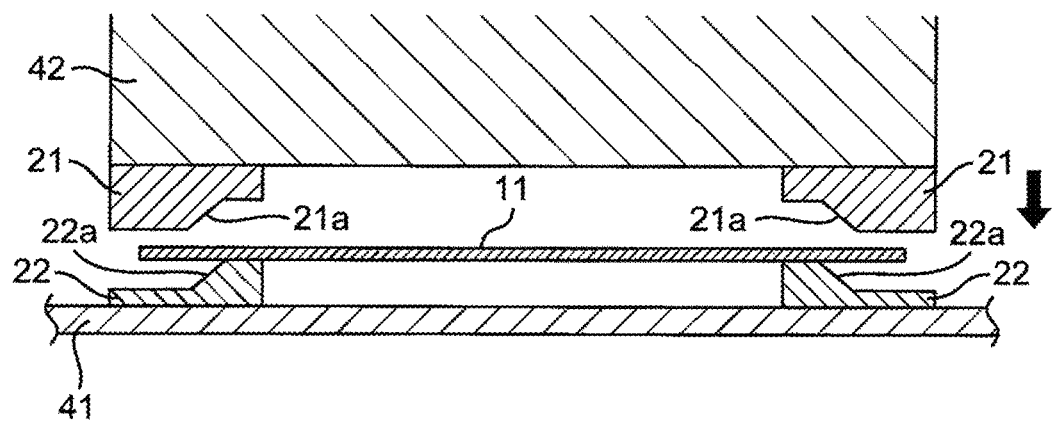
FIG. 4 is a cross-sectional view illustrating a working example of a manufacturing method for the filtration filter according to the embodiment.

Next, a working example of a manufacturing method for the filtration filter 1 according to the present embodiment will be described. FIG. 4 is a cross-sectional view illustrating a working example of the manufacturing method.

First, as shown in FIG. 4, the second frame member 22 was disposed on a pedestal 41 and then the circumference portion of the metallic mesh 11 was disposed on the second frame member 22. In this case the pedestal 41 was 3 mm in thickness and had a principal surface being 15 cm×10.5 cm in size. The second frame member 22 was placed in a hole or groove (not shown) provided in the pedestal 41 and having a depth of 1.5 cm so as to fix the relative position between the pedestal 41 and the second frame member 22.

Thereafter, the first frame member 21 was pressed, using a pressing machine 42, against the second frame member 22 with the circumference portion of the metallic mesh 11 interposed therebetween so as to integrate the first frame member 21 and the second frame member 22. The inside and outside diameters of the first and second frame members 21 and 22 were 12 mm and 14 mm, respectively. The pressing machine 42 had a circular pressing surface 14 mm in diameter. A pressing force by the pressing machine 42 was set to be 20 kg, a pressing speed was set at two seconds, and a holding time of the pressing state was set to be one second. As a material of the pedestal 41 and the pressing surface of the pressing machine 42, stainless steel (SUS304: standard hardness is equal to or less than 187 HB) was used. In this case, a pin (not shown) provided on the second frame member 22 was inserted into a through-hole for pin insertion (not shown) provided in the first frame member 21 so as to integrate the first frame member 21 and the second frame member 22. In the case where the pressing speed was set at one second, it was confirmed that the percent defective was increased due to the pin on the second frame member 22 being broken.

In the case where the first frame member 21 and the second frame member 22 were integrated under the above-described conditions, the metallic mesh 11 was pinched between the first and second frame members 21 and 22 and deformed so as to have the first and second bending sections 31 and 32, as shown in FIG. 2. Further, creases were formed in the transition portion between the first and second bending sections 31 and 32, thereby forming the streaked projections.

Figure 5:
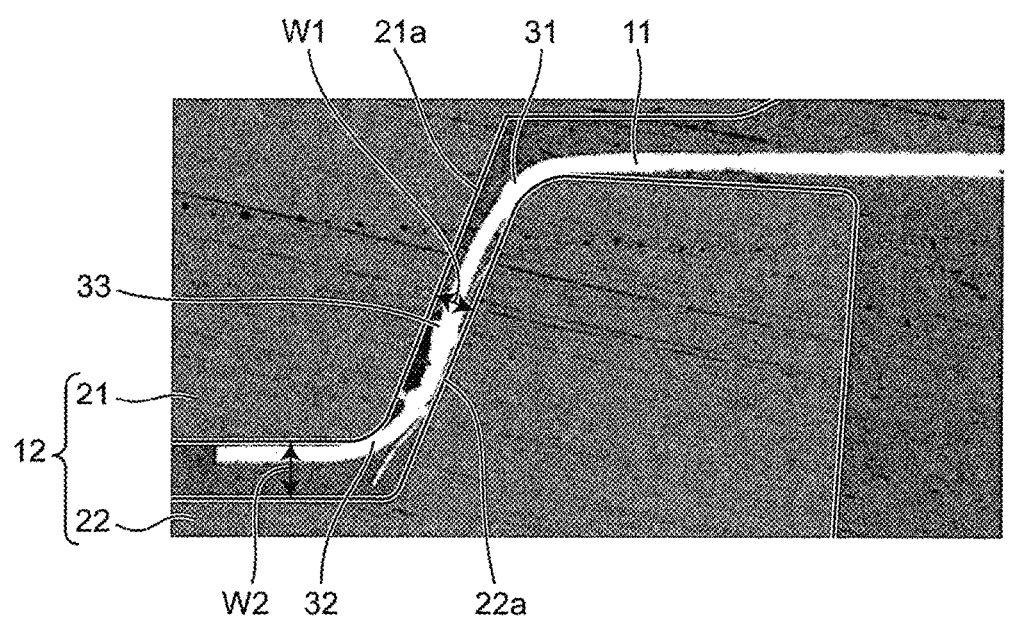
FIG. 5 is a diagram in which part of the filtration filter manufactured by the manufacturing method in FIG. 4 is observed under an electron microscope and illustrated.

FIG. 5 is a diagram in which part of the filtration filter 1 manufactured by the manufacturing method in FIG. 4 is observed under an electron microscope. From FIG. 5, it can be confirmed that, by using the above-discussed manufacturing method, the plurality of streaked projections 33 can be formed in the transition portion between the first and second bending sections 31 and 32 without additionally providing a material to be formed as the streaked projections 33.

Note that in the filtration filter 1 manufactured by the above-discussed manufacturing method, it was confirmed that radial creases (bumps extending substantially in a radial direction of the metallic mesh 11 in plan view) were generated in an area closer to the second bending section 32 than the first bending section 31 of the metallic mesh 1.

In the case where a gap W1 between the first frame member 21 and the second frame member 22 holding the transition portion of the metallic porous member 11 is excessively large, the friction force generated by the plurality of streaked projections 33 is reduced. This causes the holding force of the first and second frame members 21 and 22 with respect to the metallic mesh 11 to be reduced. Meanwhile, in the case where a gap W2 between the first frame member 21 and the second frame member 22 which is radially outward from the second bending section 32 of the metallic mesh 11 is too small, it may not be possible to make the gap W1 sufficiently small because of contact with the first and second frame members 21 and 22 at the location of the gap W2. In such case, the friction force generated by the plurality of streaked projections 33 is lowered so that the holding force of the first and second frame members 21 and 22 with respect to the metallic mesh 11 is lowered. Further, in such case, because the radially outward portion of the metallic mesh 11 (i.e., the position radially outward of the second bending section 32) is pinched between the first frame member 21 and the second frame member 22, a tensile force is generated in a plane direction of the metallic mesh 11 and a situation where the metallic mesh 11 is broken may possibly occur.

To deal with this, as shown in FIG. 5, it is preferable for the first and second frame members 21 and 22 to be constituted so that the gap W2 is larger than the gap W1. This makes it possible to suppress the reduction in the friction force generated by the plurality of streaked projections 33 and also suppress the reduction in the holding force of the first and second frame members 21 and 22 with respect to the metallic mesh 11. In addition, it is possible to reduce the possibility that the metallic mesh 11 is broken. For example, the gap W1 can be 50 μm and the gap W2 can be 100

(Filtration Filter Device)

The filtration filter 1 is generally encompassed in a housing provided with a fluid incoming path and a fluid discharging path, and is used to filter out, with the metallic mesh 11, a filtration target object contained in a fluid entering from the fluid incoming path and discharge the fluid having passed through the metallic mesh from the fluid discharging path. Hereinafter, a device constituted of the filtration filter 1 and the housing is referred to as a filtration filter device.

Figure 6:
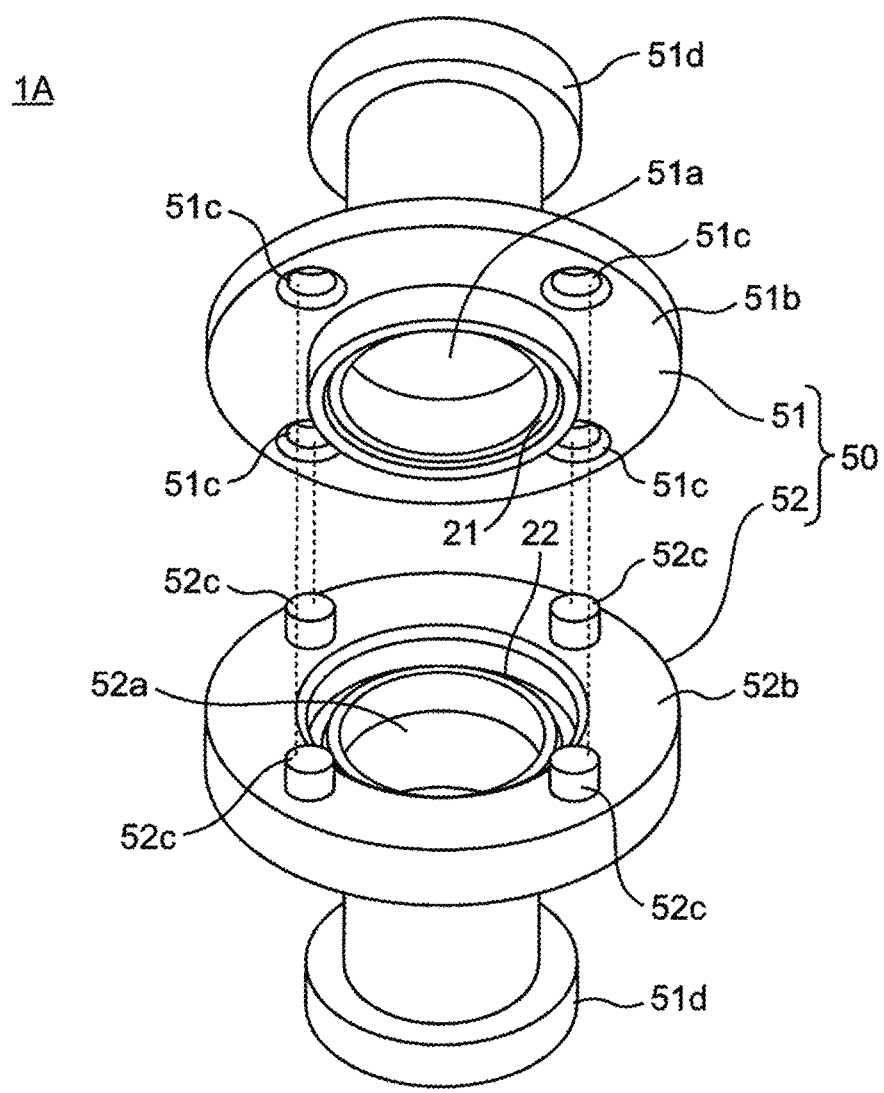
FIG. 6 is an exploded perspective view illustrating a general structure of a filtration filter device including the filtration filter shown in FIG. 1.
Figure 7:
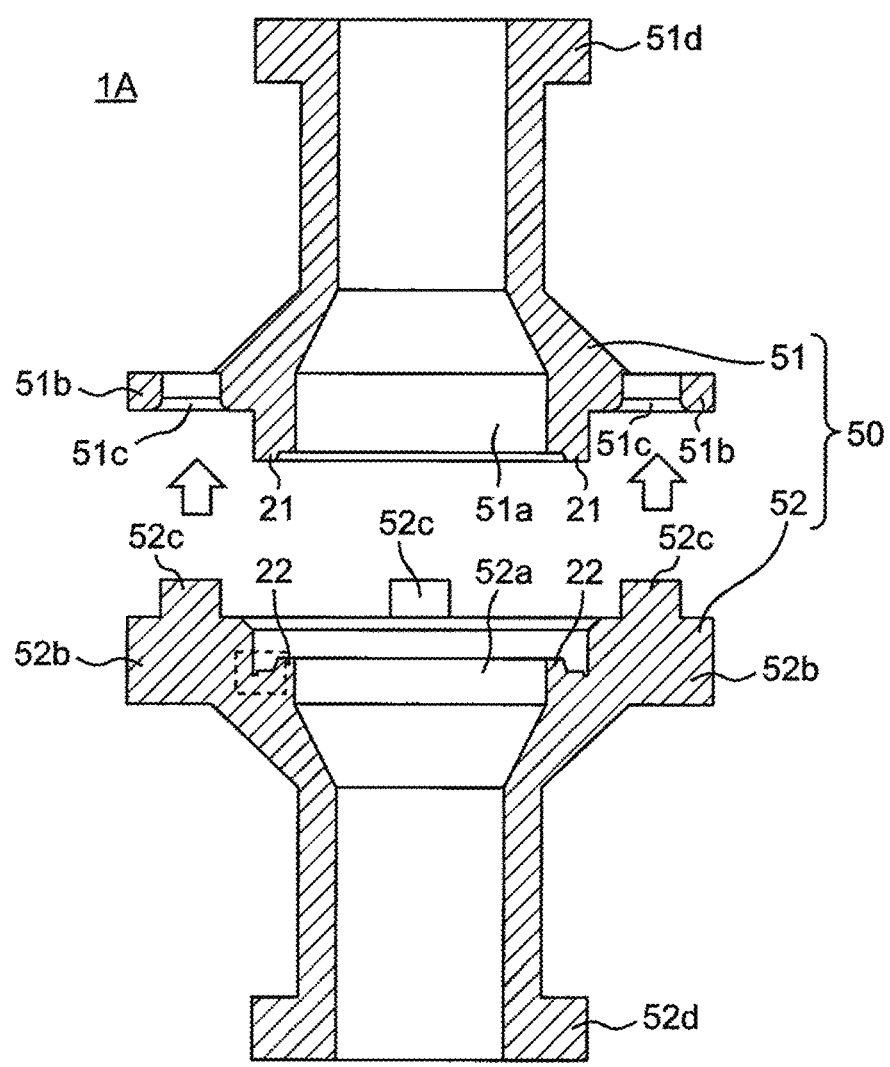
FIG. 7 is an exploded cross-sectional view illustrating a general structure of the filtration filter device including the filtration filter shown in FIG. 1.

FIG. 6 is an exploded perspective view illustrating a general structure of a filtration filter device 1A including the filtration filter 1 and FIG. 7 is an exploded cross-sectional view of the filtration filter device 1A. Note that in FIGS. 6 and 7, the metallic mesh 11 is not illustrated.

As shown in FIGS. 6 and 7, the filtration filter device 1A includes a housing 50 encompassing the metallic mesh 11. The housing 50 includes a first housing section 51 formed in a substantially cylindrical shape and a second housing section 52 also formed in a substantially cylindrical shape.

The first housing section 51 includes a fluid incoming path 51a that opposes a first principal surface of the metallic mesh 11. The first housing section 51 is preferably integrally formed with the first frame member 21. In other words, the first frame member 21 is constituted as part of the first housing section 51. The inside diameter of the first frame member 21 is, for example, 6.0 mm.

A flange 51b extending in a direction intersecting with (for example, orthogonal to) an extension direction of the fluid incoming path 51a is provided around the first frame member 21 of the first housing section 51. A plurality of through-holes 51c pass through the flange 51b in a thickness direction thereof. Preferably four through-holes 51c formed at intervals of 90 degrees each are produced. The thickness of the flange 51b is, for example, 2.1 mm. The diameter of the through-hole 51c is, for example, 1.42 mm. The length of the through-hole 51c is, for example, 0.9 mm.

The second housing section 52 includes a fluid discharging path 52a that opposes a second principal surface (the other principal surface) of the metallic mesh 11. The second housing section 52 is preferably integrally formed with the second frame member 22. In other words, the second frame member 22 is preferably constituted as part of the second housing section 52. The inside diameter of the second frame member 22 is, for example, 6.0 mm.

A flange 52b extending in a direction intersecting with (for example, orthogonal to) an extension direction of the fluid discharging path 52a is provided around the second frame member 22 of the second housing section 52. A plurality of projections 52c project in a thickness direction of the flange 52b. Preferably four projections 52c are formed at intervals of 90 degrees each. The diameter of the projections 52c is, for example, 1.4 mm. The height of the projection 52c is, for example, 0.9 mm.

The first housing section 51 and the second housing section 52 are fitted to each other by the plurality of projections 52c being inserted into the plurality of through-holes 51c. When the first housing section 51 and the second housing section 52 are fitted to each other, the circumference portion of the metallic mesh 11 is held between the first frame member 21 and the second frame member 22, as shown in FIG. 2.

In this structure, since the filtration filter 1 having the streaked projections 33 is provided, it is possible to increase the holding force of the first and second frame members 21 and 22 with respect to the metallic mesh 11 and decrease the number of components. Further, because the first frame member 21 is integrally formed with the first housing section 51 and the second frame member 22 is integrally formed with the second housing section 52, it is possible to lessen the number of components in the filtration filter device 1A. In other words, the filtration filter device 1A can be constituted of three components.

Figure 8:
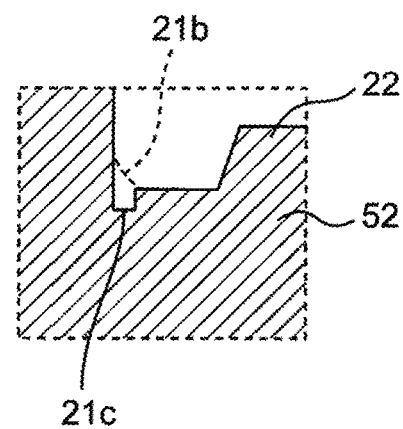
FIG. 8 is an enlarged cross-sectional view of a portion enclosed by a broken line in FIG. 7.

In the case where a circumference end portion of the second frame member 21 is formed to be L-shaped, it is difficult to form a corner portion at a right angle and therefore the corner portion is formed to be an arcuate shaped portion 21b as indicated by a dotted line in FIG. 8. This arcuate shaped portion 21b causes the gap W2, having been explained using FIG. 6, to be smaller so that the outer side portion relative to the second bending section 32 of the metallic mesh 11 makes contact with the first and second frame members 21 and 22, whereby it may not be possible to make the gap W1 sufficiently small. In other words, the arcuate shaped portion 21b causes the friction force generated by the plurality of streaked projections 33 to be reduced. Accordingly, it is preferable to provide a groove 21c which is recessed downward and having a ring-like shape in the circumference end portion of the second frame member 21, as shown in FIG. 8. This makes it possible to suppress a situation where the friction force generated by the plurality of streaked projections 33 is reduced. The depth and the width of the groove 21c are each, for example, 0.1 mm.

The filtration filter device 1A can be used, for example, by attaching it to a Luer-Lok syringe (not shown), for example. In this case, a ridge or the like capable of being connected to the Luer-Lok syringe may be provided on at least one of a terminal portion 51d (upper end portion in FIG. 7) of the first housing section 51 and a terminal portion 52d (lower end portion in FIG. 7) of the second housing section 52.

Although it has been discussed above that the first housing section 51 and the second housing section 52 are so constituted as to be fitted to each other by the plurality of projections 52c being inserted into the plurality of through-holes 51c, the invention is not limited thereto. For example, the first housing section 51 and the second housing section 52 may be so constituted as to be fitted to each other by providing a plurality of through-holes in the first housing section 51, providing a plurality of projections on the second housing section 52, and then inserting the plurality of projections into the plurality of through-holes. It is sufficient that the first housing section 51 and the second housing section 52 are so constituted as to be fitted to each other.

Figure 9:
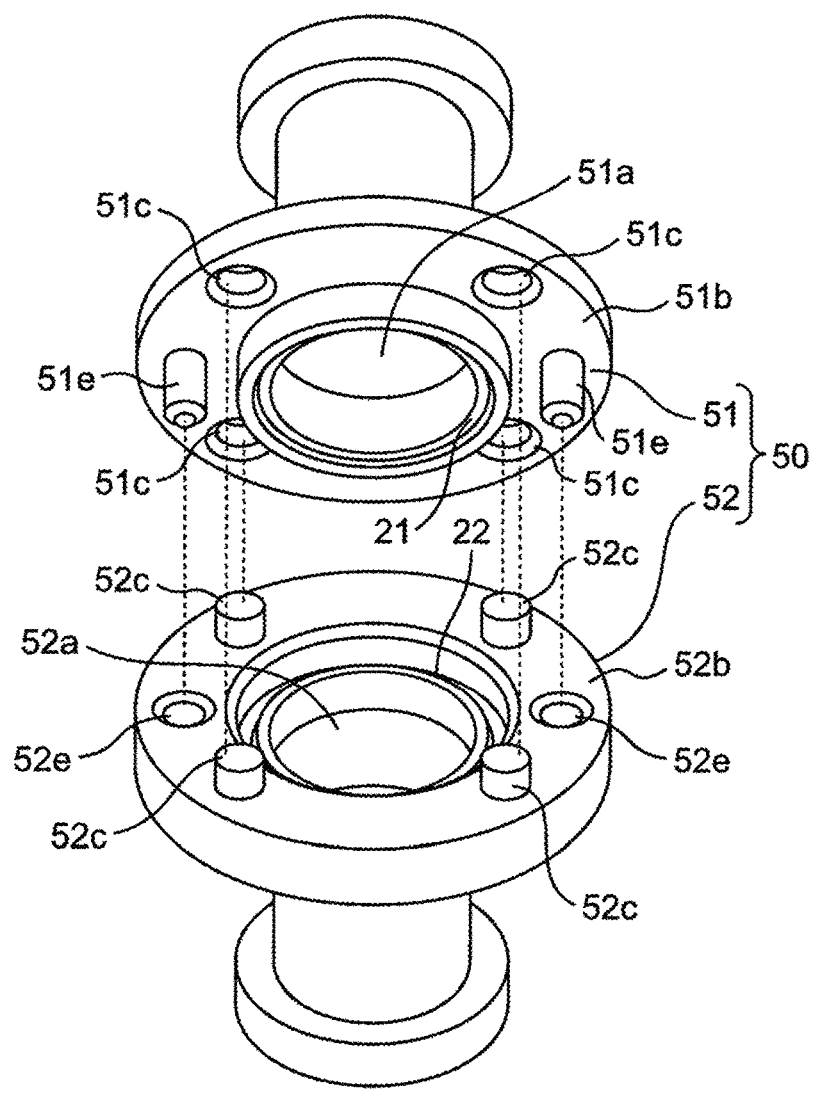
FIG. 9 is an exploded perspective view illustrating a variation on the filtration filter device shown in FIG. 6.

As shown in FIG. 9, a plurality of position adjustment pins 51e may be provided on the flange 51b of the first housing section 51 and a plurality of corresponding through-holes 52e may be provided in the flange 52b of the second housing section 52. In this case the position adjustment pins 51e may be inserted into the through-holes 52e whereby the position adjustment may be roughly determined. With this structure, in the state of the position adjustment has been roughly determined, because the plurality of projections 52c can be inserted into the plurality of through-holes 51c, the first housing section 51 and the second housing section 52 can be more easily and more surely fitted to each other.

Preferably two position adjustment pins 51e are formed at an interval of 180 degrees and are each formed at the midpoint of the through-holes 51c adjacent to each other. The diameter of the position adjustment pins 51e is, for example, 1.15 mm. The height of the position adjustment pins 51e is, for example, 2.1 mm. Preferably two position adjustment holes 52e are formed at an interval of 180 degrees and are each formed at the midpoint of the projections 52c adjacent to each other. The diameter of the position adjustment holes 52e is, for example, 1.3 mm. The length of the position adjustment holes 52e is, for example, 2.1 mm.

Figure 10:
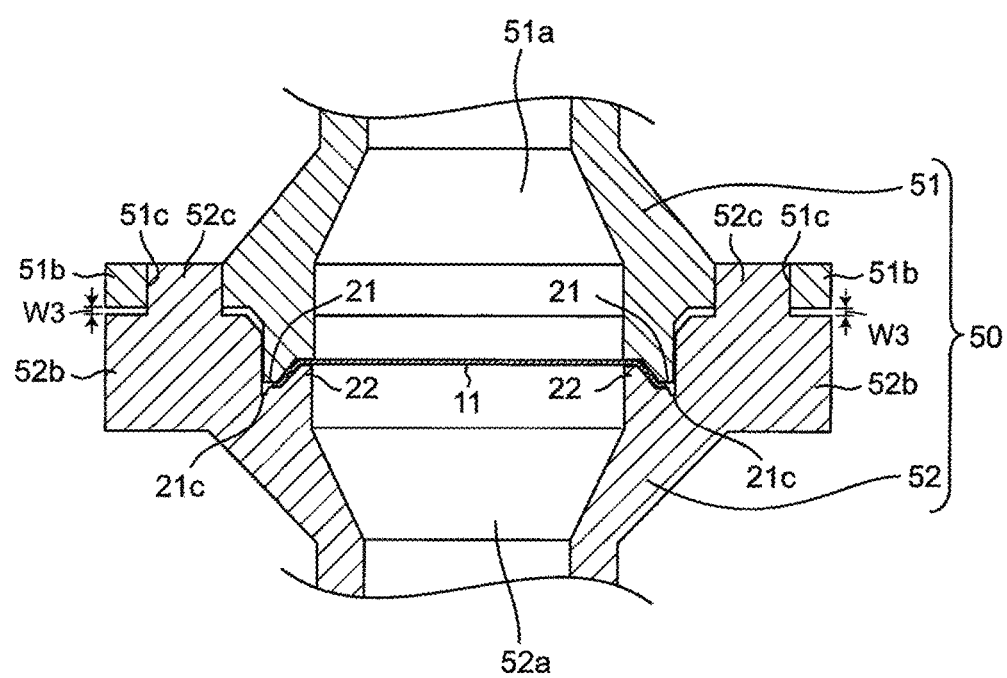
FIG. 10 is an assembly cross-sectional view in which part of the general structure of the filtration filter device shown in FIG. 6 is enlarged and illustrated.

Further, as shown in FIG. 10, in a state where the first housing section 51 and the second housing section 52 are fitted to each other, it is preferable for a gap W3 to be provided between the flange 51b of the first housing section 51 and the flange 52b of the second housing section 52. This structure can prevent a situation where the first housing section 51 and the second housing section 52 make contact with each other before the gap W1 (see FIG. 5) between the first frame member 21 and the second frame member 22 in which the streaked projections 33 are positioned has an appropriate dimension during the assembly (fitting). With this, the gap W1 is made to have an appropriate dimension, the friction force by the streaked projections 33 is increased, and thus the holding force of the first and second frame members 21 and 22 with respect to the metallic mesh 11 can be increased. In addition, by confirming whether or not the gap W3 falls within a predetermined range, it can be assumed whether or not the gap W1 between the first frame member 21 and the second frame member 22 in which the streaked projections 33 are positioned has an appropriate dimension.

Note that the flange 51b is an example of a circumference portion of the first housing section 51, and the flange 52b is an example of a circumference portion of the second housing section 52. The gap W3 may be provided between the circumference portion of the first housing section 51 and the circumference portion of the second housing section 52 so as to be visually recognized from the exterior. Further, the gap W3 may be so provided as to prevent a situation where the first housing section 51 and the second housing section 52 make contact with each other excluding fitting portions (for example, the through-holes 51c and the projections 52c) of the first housing section 51 and the second housing section 52. Chamfering processing may be carried out on a lower end edge of the circumference portion of the first housing section 51 and/or on an upper end edge of the circumference portion of the second housing section 52, in order to prevent the gap W3 from being blocked by burrs or the like.

It is sufficient for the gap W3 to be greater than 0 mm, for example, and have a dimension that can be easily measured. The gap W3 is, for example, 0.05 mm to 0.2 mm.

The present invention is sufficiently described being related to the preferred embodiments with reference to the appended drawings; however, it is apparent that various kinds of variations and modifications can be made by those skilled in the art. It is to be understood that such variations and modifications which are made without departing from the appended scope and spirit of the invention are also encompassed in the invention.

INDUSTRIAL APPLICABILITY

The present invention can increase the holding force of the first and second frame members with respect to the metallic mesh and decrease the number of components; as such, the invention can be usefully applied to a filtration filter and a filtration filter device configured to filter out filtration target objects such as biological materials, PM 2.5, and the like contained in fluids.

REFERENCE SIGNS LIST

1 FILTRATION FILTER
1A FILTRATION FILTER DEVICE
11 METALLIC MESH
11a THROUGH-HOLE
11b PRINCIPAL SURFACE
12 FRAME BODY
21 FIRST FRAME MEMBER
21a SLOPE
21b R SHAPE PORTION
22 SECOND FRAME MEMBER
22a SLOPE
31 FIRST BENDING SECTION
32 SECOND BENDING SECTION
33 STREAKED PROJECTION
41 PEDESTAL
42 PRESSING MACHINE
50 HOUSING
51 FIRST HOUSING SECTION
51a FLUID INCOMING PATH
51b FLANGE
51c THROUGH-HOLE
51d TERMINAL PORTION
51e POSITION ADJUSTMENT PIN
52 SECOND HOUSING SECTION
52a FLUID DISCHARGING PATH
52b FLANGE
52c PROJECTION
52d TERMINAL PORTION
52e POSITION ADJUSTMENT HOLE

The invention claimed is:

1. A filtration filter, comprising:
   (a) a metallic mesh having first and second opposed principle surfaces and a circumference, the metallic mesh having:
      (i) a radially inner portion that lies in a principal plane; and
      (ii) a radially outer portion, at least a part of the radially outer portion, as viewed along a cross-section lying perpendicular to the principal plane, extending at an obtuse angle with respect to the principal plane, the outer portion containing streaked projections, each of the streaked projections being formed by a respective portion of the metallic mesh that is bent back on itself such that segments of the respective portion overlap one another; and
   (b) a housing holding the metallic mesh and defining a fluid flow path which has a central axis and passes through the radially inner portion of the metallic mesh, the housing including:
      (i) a first housing section defining a first portion of the fluid flow path; and
      (ii) a second housing section defining a second portion of the fluid flow path, the first and second housing sections forming a gap, the radially outer portion of the metallic mesh extending through at least a portion of the gap such that at least some of the streaked projections are located in the gap.

2. The filtration filter according to claim 1, wherein the gap is 0.05 mm to 0.2 mm.

3. The filtration filter according to claim 1, wherein the first and second housing sections have first and second flanges, respectively, the first and second flanges being located radially outward of the gap and limiting the minimum size of the gap.

4. The filtration filter of claim 3, wherein outer surfaces of the first and second flanges abut one another and ensure that the gap exists between the first and second housing sections when the first and second housing sections are fitted to one another.

5. The filtration filter according to claim 4, wherein at least one of the first and second flanges has a chamfered outer surface facing the other of the first and second flanges.

6. The filtration filter according to claim 1, wherein:
   the gap includes first, second and third contiguous portions, the third portion being radially outward of the first and second portions, the second portion being radially outward of the first portion; and
   the radially outer portion of the metallic mesh has a radially outermost portion that extends parallel to, and is spaced from, the principal plane and lies in the third portion of the gap, the third portion of the gap including a ring shaped groove extending perpendicular to the principal plane with a portion of the radially outermost portion of the metallic mesh extending over the ring shaped groove.

7. The filtration filter according to claim 1, wherein the gap includes:
   (a) a planar first portion in which a radially innermost portion of the radially outer portion of the metallic mesh is located;
   (b) a second portion forming a truncated cone in which a radially intermediate portion of the radially outer portion of the metallic mesh is located.

8. The filtration filter according to claim 7, wherein the gap further comprises a third portion located radially outward of the first and second portions of the gap, the third portion of the gap extending parallel to the principal plane, and a portion of the radially outer portion of the metallic mesh extending into the third portion of the gap.

9. The filtration filter according to claim 8, wherein the metallic mesh has a first bending section at an interface between the first and second portions of the gap and a second bending section at an interface between the second and third portions of the gap.

10. The filtration filter according to claim 1, wherein all of the streaked projections are located in the gap.

11. The filtration filter according to claim 1, wherein the gap has first, second and third portions, each, when viewed along a cross section lying parallel to and extending through the central axis of the fluid flow path, lies in a respective plane, such that the third portion is radially outward of the second portion and the second portion is radially outward of the first portion, and the streaked projections are located in the second portion and are not located in the first and third portions.

12. The filtration filter according to claim 11, wherein, when viewed along the cross section lying parallel to and extending through the central axis of the fluid flow path, the first and third portions of the gap lie parallel to the principal plane and the second portion lies at an obtuse angle with respect to the principal plane.

13. The filtration filter according to claim 1, wherein the gap, when viewed along a cross section lying parallel to and extending through the central axis of the fluid flow path, includes:

a first portion lying in a plane that is parallel to the principal plane and having a gap width A; and a second portion lying in a plane that extends obtuse to the principal plane and having a gap width B which is smaller than the gap width A, the second portion being radially outward of the first portion.

14. The filtration filter according to claim 13, wherein the width of the gap of the first portion is constant throughout the length of the first portion and the width of the gap of the second portion is constant throughout the length of the second portion.

15. The filtration filter according to claim 6, wherein, when viewed along a cross section lying parallel to and extending through the central axis of the fluid flow path, the first and third portions lie parallel to the principal plane and the second portion lies at an obtuse angle with respect to the principal plane.

16. A filtration filter, comprising:
(a) a housing having first and second housing sections joined together to form a fluid flow path having a central axis, the housing defining a gap extending radially outward from the central axis of the fluid flow path and having, as viewed along a cross section lying parallel to and extending through the central axis of the fluid flow path:
  (i) a first portion extending outwardly from the fluid flow path and having a central axis which extends perpendicular to the central axis of the fluid flow path;
  (ii) a second portion which is contiguous with the first portion and extends outwardly from the first portion, the second portion having a central axis which lies at an obtuse angle with respect to the central axis of the fluid flow path; and
  (iii) a third portion which is contiguous with the second portion and extends outwardly from the second portion, the third portion having a central axis which lies perpendicular to the central axis of the fluid flow path;
(b) a metallic mesh supported by the housing and including a radially innermost portion extending through the fluid flow path and lying perpendicular to the central axis of the fluid flow path and a radially outer portion which is supported by the housing and extends into the first, second and third portions of the gap, at least a part of the radially outer portion containing streaked projections located in the second portion of the gap, each of the streaked projections being formed by a respective portion of the metallic mesh that is bent back on itself such that segments of the respective portion overlap one another.

\* \* \* \* \*